Sept. 24, 1929.    W. R. GRIFFEY    1,728,931
MIRROR BRACKET
Filed Jan. 14, 1928
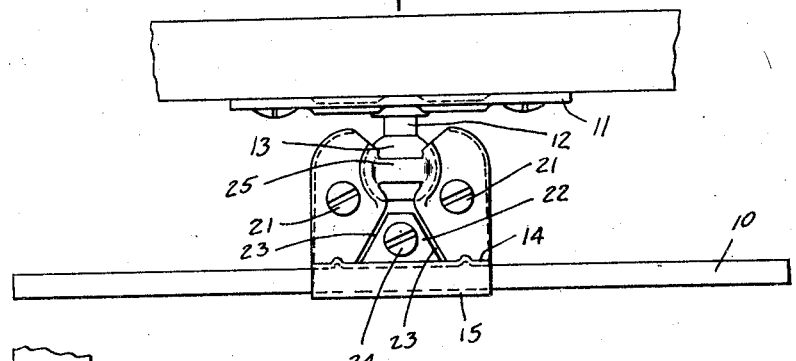
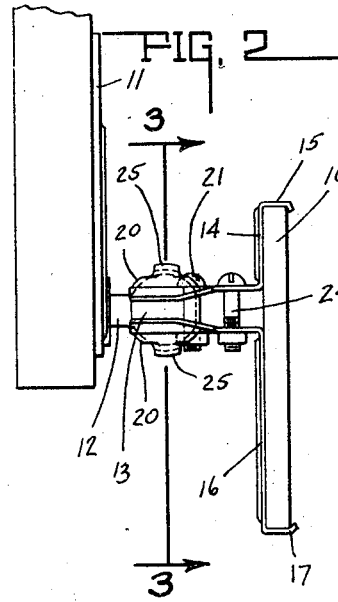
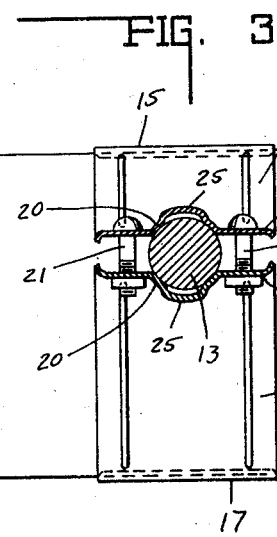
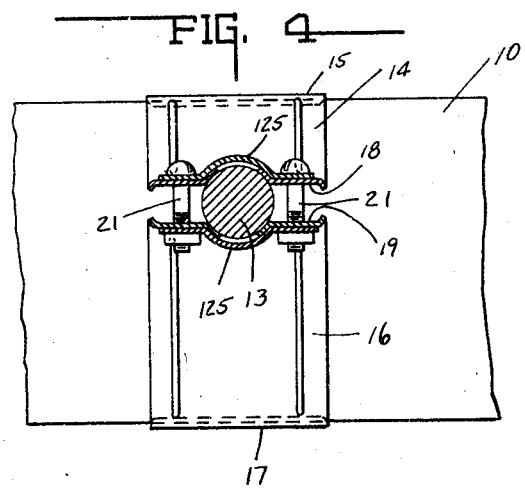
INVENTOR.
WILLIAM R. GRIFFEY.
BY
ATTORNEYS.

Patented Sept. 24, 1929

1,728,931

UNITED STATES PATENT OFFICE

WILLIAM R. GRIFFEY, OF INDIANAPOLIS, INDIANA

MIRROR BRACKET

Application filed January 14, 1928. Serial No. 246,841.

This invention relates to an adjustable bracket for supporting rear view mirrors such as are commonly used upon automobiles and other vehicles.

The principal object of the invention is to provide a bracket for adjustably supporting the mirror through a universal mounting such as a ball and socket connection, with the supporting plate.

The principal feature of the invention resides in the simplified construction of the bracket wherein it may be independently clamped to the ball support and to the mirror. Thus the bracket portions engaging and clamping opposite edges of the mirror may be held in clamping engagement and under a definite tension independently of the clamping ears which engage and frictionally clamp the ball and form the socket therefor under such tension as to secure the mirror in adjusted position. This is accomplished by the construction and arrangement of the bracket as will be hereinafter more fully set forth and described.

The full nature of the invention will be understood from the accompanying drawings and the following description and claims:

Fig. 1 is a plan view looking down on the mirror and bracket support. Fig. 2 is an end elevation thereof. Fig. 3 is a section taken on the line 3—3 Fig. 2. Fig. 4 shows a modified form thereof.

In the drawings there is shown a rear view mirror 10 and a supporting plate 11 adapted to be fixedly secured to the vehicle. Extending outwardly from the plate 11 there is a stud 12 having a ball 13 supported thereby.

The principal members of the bracket comprise the clamping member 14 which is provided with the usual gripping flange 15 for engaging the upper edge of the mirror 10, and the lower clamping member 16 having the gripping flange 17 for engaging the lower edge of the mirror.

Each of the clamps 14 and 16 have clamping wings 18 and 19 extending outwardly therefrom and provided with socket forming portions 20 adapted to embrace the ball 13. The wings 18 and 19 are secured and drawn together by the bolts 21 so as to exert a spring tension against the ball 13 for frictionally securing the wings and their respective brackets in adjusted position with respect thereto.

Intermediate the wings 18 and 19 there are provided flanges 22 which are likewise bent outwardly at right angles from their respective clamping members 14 and 16. The flanges 22 are separated from the clamping wings by the slots 23 and do not come into contact therewith, or with the ball 13. They are relatively short and rigid, lacking in the resiliency of the longer clamping wings, and are connected together adjacent the clamping members 14 and 16 by the bolt 24.

By means of this construction, it will be noted that the bracket members 14 and 16 may be formed in the usual manner with the clamping wings extending at right angles therefrom, and in forming the socket forming portions of said wings, the flanges 22 may be separated therefrom by cutting the slots 23. Thus while the wings 18 and 19 and the flanges 22 are both bent outwardly from the clamping members, they are entirely independent of each other. By reason of the shorter and more rigid character of the flanges 22, and by reason of the location of the bolt 24 adjacent the clamping members 14 and 16, said bolt 24 will draw said clamping members into clamping engagement with the mirror for rigidly securing the same. Entirely independent thereof, the clamping wings 18 and 19 are drawn into engagement with the ball 13 so as to frictionally clamp thereabout and support the bracket in adjusted position. The clamping action on the ball may be varied by the bolts 21 without effecting the clamping action of the flanges 15 and 17 on the mirror.

The spaced clamping wings 18 and 19 may be secured together by a bridge portion 25 formed integral therewith and extending across the ball, or a bridging strip 125 may be separately formed and held in place by the bolts 21 with respect to said wings, as shown in the modified form illustrated by Fig. 4.

The invention claimed is:

1. In a rear view mirror bracket, a supporting plate having a ball support mounted thereon, a pair of clamping members adapted to engage and clamp opposite edges of the mirror, a clamping wing extending outwardly from each of said members adapted to provide a socket for engaging and frictionally clamping the opposite sides of the ball, and a centrally disposed flange extending outwardly from each of said members and spaced from said wings for securing said members together and holding them in mirror clamping position.

2. In a rear view mirror bracket, a supporting plate having a ball support mounted thereon, a pair of clamping members adapted to engage and clamp opposite edges of the mirror, means formed on each of said members for engaging and frictionally clamping said ball, and means on each of said members positioned intermediate said clamping means for securing them together and holding them in mirror clamping position independently of said ball engaging means.

3. In a rear view mirror bracket, a supporting plate having a ball support mounted thereon, a pair of clamping members adapted to engage and clamp opposite edges of the mirror, outwardly extending portions bent at substantial right angles from each of said members, each of said outwardly extending portions being slotted for providing separate and independent sections, means on one of said sections cooperating with the corresponding section on the other member for clamping the mirror and means on the other section cooperating with the corresponding section on the other member for independently clamping said ball.

4. In a rear view mirror bracket, a supporting plate having a ball support mounted thereon, a pair of clamping members adapted to engage and clamp opposite edges of the mirror, said clamping members being formed with outwardly extending portions bent from the inner edges thereof so as to lie adjacent to each other in substantially parallel relation, means for clamping the outer side portions thereof about said ball, one of said portions having the center thereof cut away to form an independent flange, and means on said centrally disposed independent flange cooperating with the other said portion for rigidly clamping the opposite edges of said mirror.

In witness whereof, I have hereunto affixed my signature.

WILLIAM R. GRIFFEY.